United States Patent
Keighran et al.

(10) Patent No.: US 10,498,794 B1
(45) Date of Patent: Dec. 3, 2019

(54) SOCIAL ENTERTAINMENT PLATFORM

(71) Applicant: Caffeine Inc., Palo Alto, CA (US)

(72) Inventors: Ben Keighran, Portola Valley, CA (US); Sam Roberts, Santa Cruz, CA (US); Justin Henzie, Concord, CA (US); Doug Richardson, Sunnyvale, CA (US); George Leontiev, San Francisco, CA (US); Peter Sankauskas, San Mateo, CA (US); Nicolas Artman, Sunnyvale, CA (US)

(73) Assignee: Caffeine, Inc., Palo Alto, CA (US)

( * ) Notice: Subject to any disclaimer, the term of this patent is extended or adjusted under 35 U.S.C. 154(b) by 0 days.

(21) Appl. No.: 15/821,613

(22) Filed: Nov. 22, 2017

Related U.S. Application Data

(60) Provisional application No. 62/428,349, filed on Nov. 30, 2016.

(51) Int. Cl.
*H04L 29/06* (2006.01)
*H04N 7/08* (2006.01)
*H04N 21/2187* (2011.01)
*G06F 3/00* (2006.01)
*H04N 21/234* (2011.01)

(52) U.S. Cl.
CPC .......... *H04L 65/607* (2013.01); *G06F 3/005* (2013.01); *H04N 7/0806* (2013.01); *H04N 21/2187* (2013.01); *H04N 21/234* (2013.01)

(58) Field of Classification Search
None
See application file for complete search history.

(56) References Cited

U.S. PATENT DOCUMENTS

| 2009/0327918 | A1* | 12/2009 | Aaron | H04L 1/0009 |
| | | | | 715/751 |
| 2018/0091869 | A1* | 3/2018 | Krishna | H04N 21/42202 |
| 2018/0288467 | A1* | 10/2018 | Holmberg | H04N 21/4302 |

* cited by examiner

*Primary Examiner* — Hsiungfei Peng
(74) *Attorney, Agent, or Firm* — Haverstock & Owens LLP

(57) ABSTRACT

Embodiments of the present invention are directed to a social entertainment platform that supports live social video streaming and messaging. One common use for this social entertainment platform is to allow audience members to watch and interact with a person playing an electronic game. The social entertainment platform allows a streamer to stream live (in substantially real-time) on a network(s), such as the Internet, for a live audience to view and to respond to the live entertainment. The social entertainment platform includes several unique areas, including a real-time broadcasting component, a real-time messaging component, and an integrated user interface (UI) component, that make the social entertainment platform advantageous to use over traditional platforms.

6 Claims, 5 Drawing Sheets

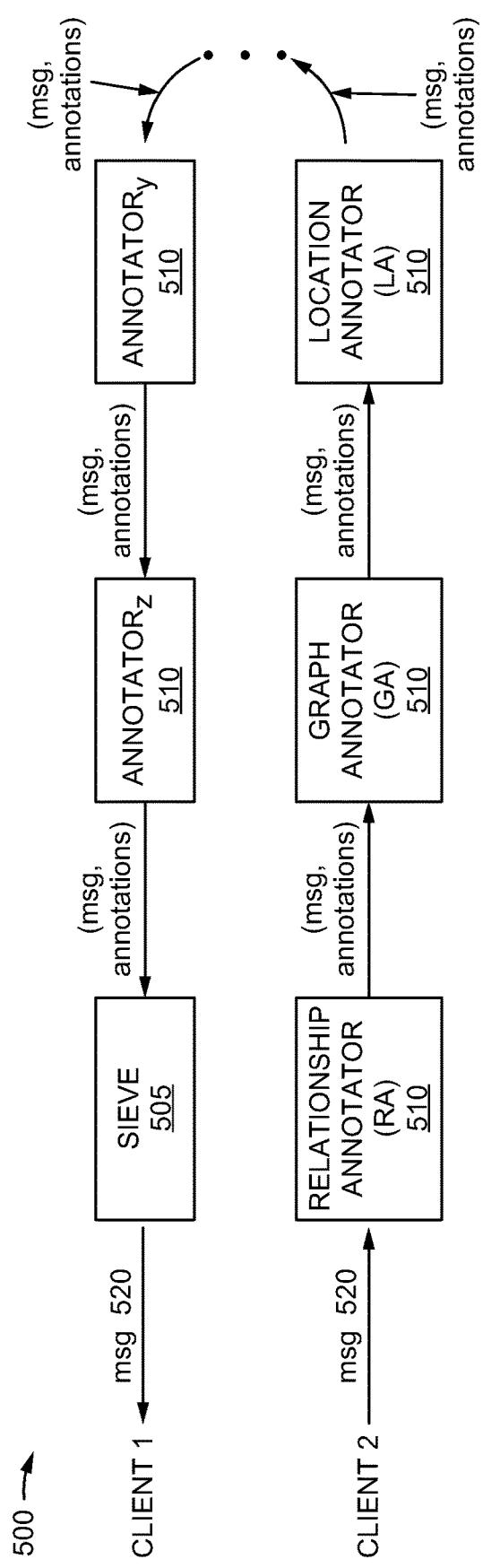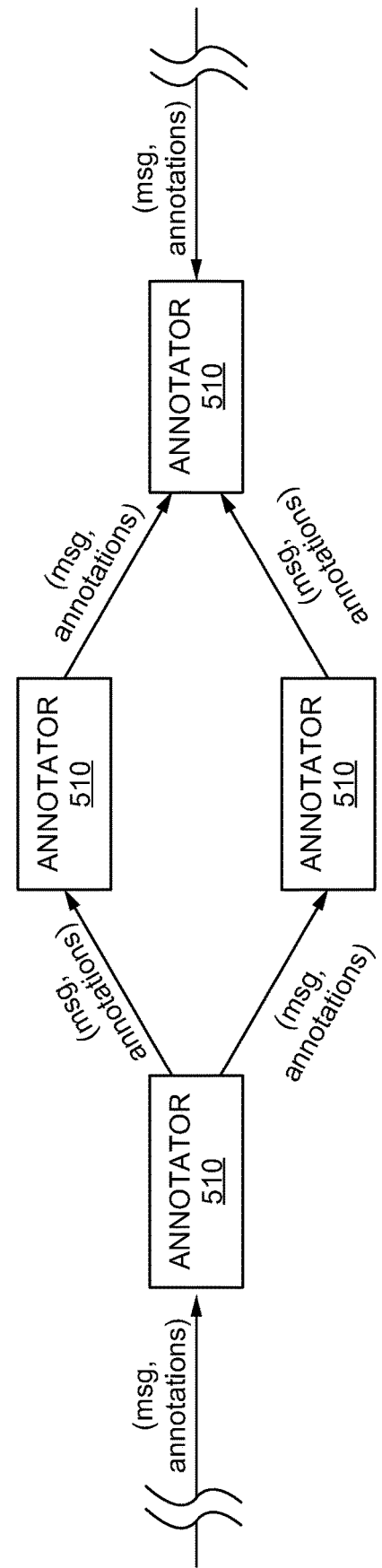
Fig. 5A
Fig. 5B

SOCIAL ENTERTAINMENT PLATFORM

RELATED APPLICATIONS

This application claims benefit of priority under 35 U.S.C. section 119(e) of the U.S. Provisional Patent Application Ser. No. 62/428,349, filed Nov. 30, 2016, entitled "Social Entertainment Platform," which is hereby incorporated by reference in its entirety.

FIELD OF INVENTION

The present invention is related to the field of streaming media processing and messaging technologies. More specifically, the present invention relates to a social entertainment platform that enables live social video streaming and messaging.

BACKGROUND OF THE INVENTION

Traditional platforms that allow a streamer to stream a live video stream and viewers to watch the live video stream, introduce significant delays in communications between the streamer and the viewers on the average of 45 seconds. Additionally, communications from the viewers to the streamer appear on a separate screen or in a separate window of the streamer's computing device. Furthermore, these communications are not controlled and, thus, can include irrelevant messages and can become voluminous, making the communications difficult to read. These factors detract from user experience. There exists a need for improvements in streaming video and messaging technologies to better the user experience.

BRIEF SUMMARY OF THE INVENTION

Embodiments of the present invention are directed to a social entertainment platform that supports live social video streaming and messaging. One common use for this social entertainment platform is to allow audience members to watch and interact with a person playing an electronic game. The social entertainment platform allows a streamer to stream live (in substantially real-time) on a network(s), such as the Internet, for a live audience to view and to respond to the live entertainment. The social entertainment platform includes several unique areas, including a real-time broadcasting component, a real-time messaging component, and an integrated user interface (UI) component, that make the social entertainment platform advantageous to use over traditional platforms.

In one aspect, a method of using social entertainment platform for real-time distribution of content from a streaming device to a plurality viewing devices is provided. The method includes injecting, by a first software executing on the streaming device, a DLL into a second software that is also executing on the streaming device such that video generated by the second software is not sent to a processing unit on the streaming device but is rather captured, frame buffer by frame buffer, by the first software executing on the streaming device. The method also includes sending by the first software the captured video to a remote location for real-time broadcasting while simultaneously generating by the first software a modified video from the captured video for rendering by the processing unit on a display unit of the streaming device.

In some embodiments, the first software is executed on the streaming device prior to executing the second software on the streaming device.

In some embodiments, generating by the first software a modified video includes writing comments to the frame buffers such that the comments are displayed as overlays when the modified video is rendered on the streaming device.

In some embodiments, the comments are generated on web browsers of the plurality of viewing devices.

In some embodiments, the comments are filtered comments that are more relevant to a user associated with the streaming computing device than not.

In some embodiments, the method further includes, after capturing, frame buffer by frame buffer, and before sending by the first software the captured video, encoding by the first software raw frames of the captured video into a compressed video stream to be transmitted in real-time by the first software to the remote location.

In some embodiments, the remote location includes a cloud infrastructure of a plurality of remote servers configured in a plurality of repeater levels such that the captured video simultaneously reaches the plurality of viewing devices.

In some embodiments, the compressed video stream also includes a live camera feed captured by the streaming device.

In some embodiments, the method further also includes receiving the captured video simultaneously at each of the plurality of viewing devices, rendering the captured video by a web browser on each of the plurality of viewing devices, and displaying a filtered view of comments on each of the plurality of viewing devices.

In another aspect, a system for real-time distribution of content from a streaming device to a plurality of viewing devices is provided. The system includes a streaming device redirecting video generated on the streaming device to be captured rather than to be rendered, transmitting therefrom an original version of the captured video while simultaneously generating a modified version of the captured video to be rendered. The system also includes a cloud infrastructure including a fan-out architecture of remote servers arranged in a plurality of repeater levels. Each of the remote servers receives and forwards a compressed video stream. The system further includes a plurality of viewing devices simultaneously receiving the compressed video stream from the cloud infrastructure. Each of the viewing devices decodes and renders the video stream in a web browser.

In some embodiments, the streaming device captures a live camera feed and transmits the live camera feed along with the original version as the compressed video stream.

In some embodiments, the streaming device and the remote servers each implements WebRTC protocols to enable web broadcasting of the compressed video stream.

In some embodiments, the plurality of viewing devices generates a plurality of comments from the web browsers.

In some embodiments, the plurality of comments are filtered for each viewer associated with one of the viewing devices and for a streamer associated with the streaming device.

In some embodiments, the modified version of the captured video is the original version of the captured video modified with filtered comments for the streamer.

In some embodiments, the filtered comments are displayed as overlays when the modified version of the captured video is rendered on the streaming device.

In some embodiments, a filtered view of comments for each viewer is also displayed in the web browser on a respective viewing device.

In some embodiments, the system also includes a real-time messaging component comprising a plurality of annotator elements and a sieve element. The plurality of annotator elements is configured in an arrangement with a first and a last of the plurality of annotator elements both in direct communication with the sieve element.

In some embodiments, each of the annotator elements includes logic to create a specific annotation regarding a comment for each requesting device, and the sieve elements includes logic to make a determination as to whether to pass the message to each requesting device based on the annotations from the plurality of annotator elements.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5A-5B illustrate exemplary real-time messaging component in accordance with some embodiments.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the present invention are directed to a social entertainment platform that supports live social video streaming and messaging. One common use for this social entertainment platform is to allow audience members to watch and interact with a person playing an electronic game. The social entertainment platform allows a streamer to stream live (in substantially real-time) on a network(s), such as the Internet, for a live audience to view and to respond to the live entertainment. The social entertainment platform includes several unique areas, including a real-time broadcasting component, a real-time messaging component, and an integrated user interface (UI) component, that make the social entertainment platform advantageous to use over traditional platforms. The social entertainment platform and associated service(s) described herein will be provided by Caffeine Inc., currently located in Palo Alto, Calif. as of the time of this application.

Overview.

Figure 1:
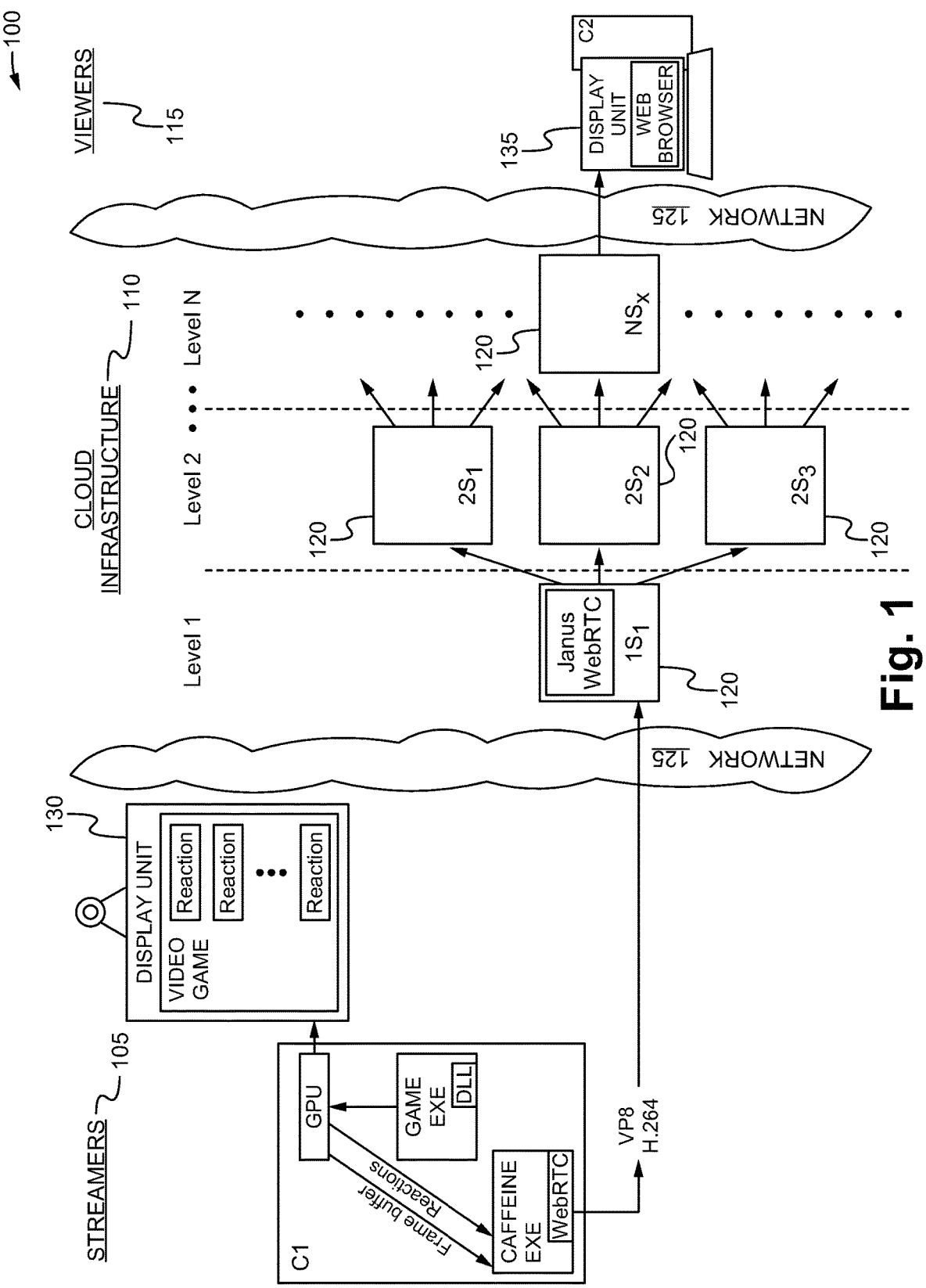
FIG. 1 illustrates an exemplary system in accordance with some embodiments.

FIG. 1 illustrates an exemplary system 100 in accordance with some embodiments. The system 100 includes a plurality of distinct entities, including streamers 105, a cloud infrastructure 110, and viewers 115. These distinct entities are communicatively coupled via a network(s) 125, such as the Internet.

The cloud infrastructure includes remote server(s) 120 that implement Caffeine's service described herein, particularly the real-time broadcasting of video. For the sake of simplicity, only one streamer 105 and only one viewer 115 are shown, although the social entertainment platform is configured to support numerous streamers 105 and numerous viewers 115 for each streamer 105 who are simultaneously utilizing the Caffeine service. Streamers 105 and viewers 115 are all users/members of the Caffeine service. The term "user" and the term "member" are used interchangeably herein. In some embodiments, each user who uses the Caffeine service has created a user account at a server, which can be a remote server 120 or an account/web server that is separate and distinct from the remote server 120.

In FIG. 1, the computing device that the streamer 105 is using is labeled as C1 and is communicatively coupled with a display unit 130 and a webcam (not labeled). C1 is herein also referred to as the streaming device. The computing device that the viewer is using is labeled as C2 and is communicatively coupled with a display unit 135. C2 is herein also referred to as the viewing device. The Caffeine client software can be installed on any streaming device (e.g., C1) to enable streaming therefrom to the cloud infrastructure 110 but does not need to be installed on any viewing device (e.g., C2) that simply accesses live streams from the cloud infrastructure 110.

For purposes of discussion, assume the streamer 105 is a video gamer and the viewer 115 accesses the streamer's feed. However, it should be noted that although the discussion herein relates to the social entertainment platform being used by video gamers and their followers/fans, it is contemplated that the social entertainment platform can be used by any and all creators in different media sectors and their followers/fans. Followers/fans are subscribers who subscribe to the streamer's feeds.

Figure 2:
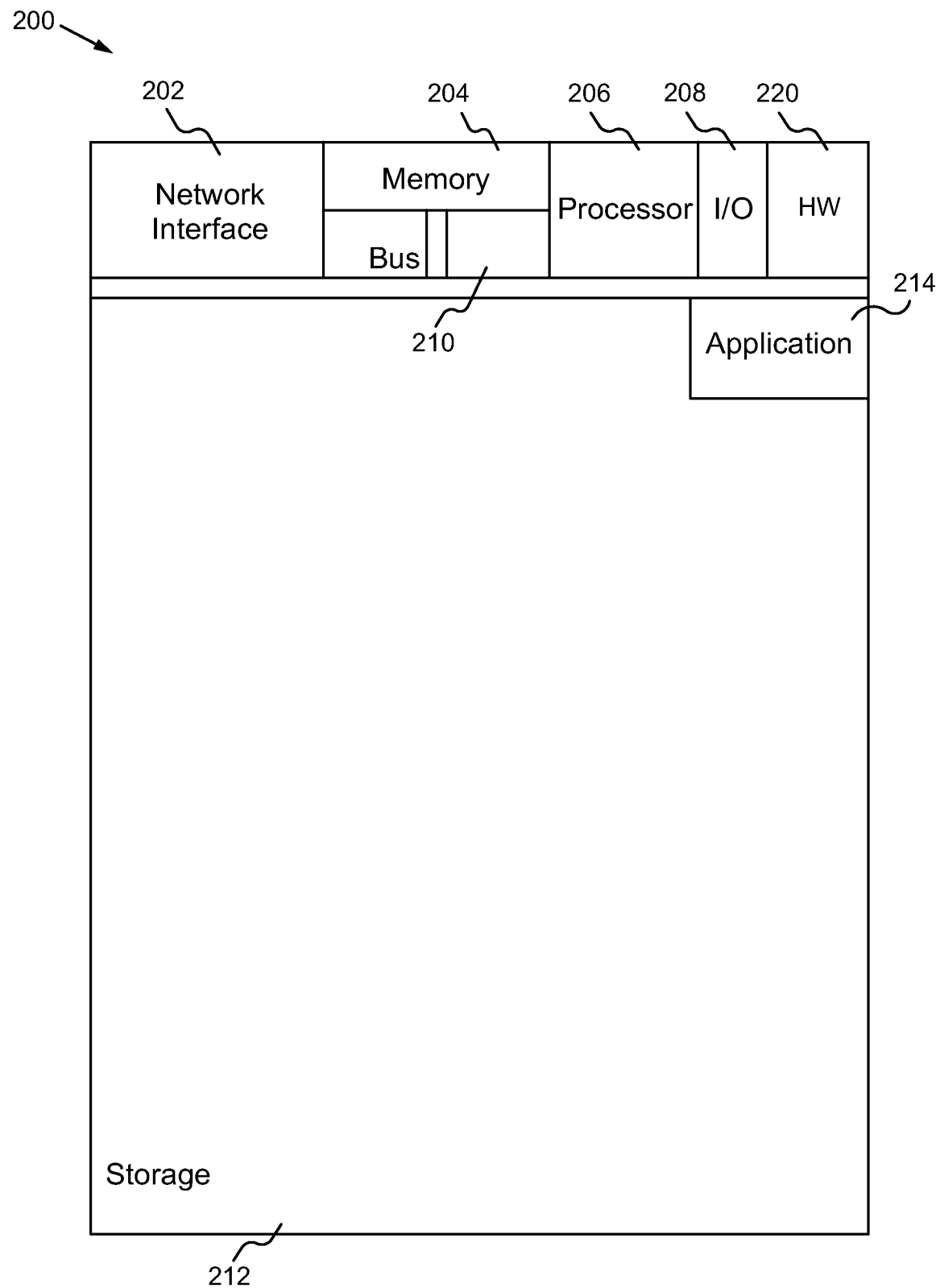
FIG. 2 illustrates a block diagram of an exemplary computing device in accordance with some embodiments.

FIG. 2 illustrates a block diagram of an exemplary computing device 200 in accordance with some embodiments. The computing device 200 is able to be used to acquire, cache, store, compute, search, transfer, communicate and/or display information. In general, a hardware structure suitable for implementing the computing device 200 includes a network interface 202, a memory 204, processor(s) 206, I/O device(s) 208, a bus 210 and a storage device 212. The choice of processor 206 is not critical as long as a suitable processor with sufficient speed is chosen. In some embodiments, the computing device 200 includes a plurality of processors 206 such as a graphics processing unit (GPU). The memory 204 is able to be any conventional computer memory known in the art. The storage device 212 is able to include a hard drive, CDROM, CDRW, DVD, DVDRW, flash memory card, RAM, ROM, EPROM, EEPROM or any other storage device. The computing device 200 is able to include one or more network interfaces 202. An example of a network interface includes a network card connected to an Ethernet or other type of LAN. The I/O device(s) 208 are able to include one or more of the following: webcam, keyboard, mouse, monitor, display, printer, modem, touchscreen, button interface and other devices. Application(s) 214, such as a third party video game and the Caffeine client software, are likely to be stored in the storage device 212 and memory 204 and are processed by the processor 206. More or less components shown in FIG. 2 are able to be included in the computing device 200. An exemplary computing device is a personal computer, a laptop computer or a handheld device, such as a cellular phone or a tablet. Other computing devices with sufficient power, speed and memory are contemplated. In some embodiments, the computing device C1, the computing device C2, any server described herein are similarly configured as the computing device 200.

Referring back to FIG. 1, on C1, the Caffeine client software is running in the background. In some embodiments, a Caffeine message that is generated by the Caffeine client software upon launch is displayed to indicate to the streamer 105 that the Caffeine client software is running. When the streamer 105 launches a game on C1, a Caffeine message generated by the Caffeine client software and indicating that it is ready to stream, is displayed as an overlay in the game. Streaming can be started such as by pressing one or more keys (e.g., CTL-ALT-L) simultaneously and/or in sequence after the game is launched, which in turn activates the webcam that is communicatively coupled with C1. In this hypothetical, assume the webcam includes a camera and a microphone that can capture video and audio of the streamer. However, a camera and a microphone separate and distinct from the camera can be used, in which case, both the camera and the microphone will be activated upon pressing the one or more keys. Another Caffeine message is thereafter displayed as an overlay in the game, indicating that streaming is now turned on. At this time, the Caffeine client software captures the game play (video and audio) and the live camera view (video and audio) on C1 and sends them to the cloud infrastructure 110 for real-time video broadcasting to viewers 115. Details of the real-time video broadcasting are further discussed below.

Figure 3:
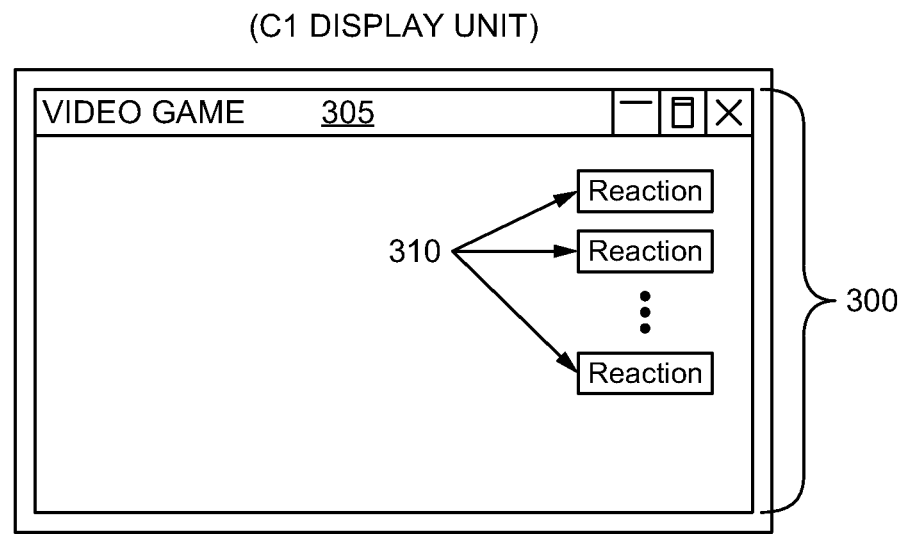
FIG. 3 illustrates an exemplary user interface on a viewer's computing device in accordance with some embodiments.

Comments 310, which are herein also referred to as reactions or messages, input by the viewers 115 for the streamer 105 are displayed in real-time as overlays on top of the game 305, as illustrated in an exemplary user interface 300 of FIG. 3. In some embodiments, each comment 310 is displayed as an image (e.g., animated GIF) overlay in the game 305. Alternatively, each comment 310 can be displayed as a text overlay in the game 305. In some embodiments, each comment 310 automatically disappears after a period of time (e.g., 30 seconds) or to make room for other new comments 310 to be displayed. Unlike traditional systems where two screens or two windows on one screen are used (one to create content, such as game play, and another to consume content, such as comments), the streamer 105 uses only one window on one screen to create and consume content. This allows the streamer 105 to be able to quickly, seamlessly and conveniently interact with the streamer's viewers 115. To respond to any of the displayed comments, the streamer 105 simply speaks to be captured by the microphone.

Referring back to FIG. 1, on C2, the viewer 115 opens a web browser (e.g., CHROME web browser, FIREFOX web browser or another web browser) to access the Caffeine website and provides login information to log into the viewer's account. In some embodiments, if the viewer 115 is not yet a member, the viewer 115 must first create an account to access the Caffeine service. Once the viewer 115 has created an account, the viewer 115 can thereafter log into the viewer's account to update the viewer's profile and preferences, can connect with other members (e.g., friends) so as to be followed by these other members and/or to follow these other members, can subscribe to certain features of the Caffeine service, can obtain virtual goods, sponsor streamers, and the like.

After a successful log in, the viewer 115 sees the viewer's own personalized lobby of feeds associated with the viewer's friends. The viewer has a mutually-initiated online relationship with each friend. The viewer's friends are members of the Caffeine service whom the viewer 115 is following and/or who are following the viewer 115. The lobby of feeds includes streams that are currently live on Caffeine that the viewer's friends are either watching or broadcasting. In some embodiments, a lobby is a graphical presentation of a list of currently available streams for viewing in a user-specific order.

Continuing with the hypothetical, assume the streamer 105 and the viewer 115 are friends. The viewer 115 can thus find the streamer's feed in the viewer's lobby. Upon selecting the streamer's feed, the corresponding video and audio of the game play and the corresponding video and audio of the streamer 105 start streaming from the cloud infrastructure 110 on C2. In some embodiments, C2 does not need to run the Caffeine client software to access and to display live streams from the cloud infrastructure 110. Instead, live streams can be viewed from the web browser on C2. However, the Caffeine client software can also be launched to view live streams.

Figure 4:
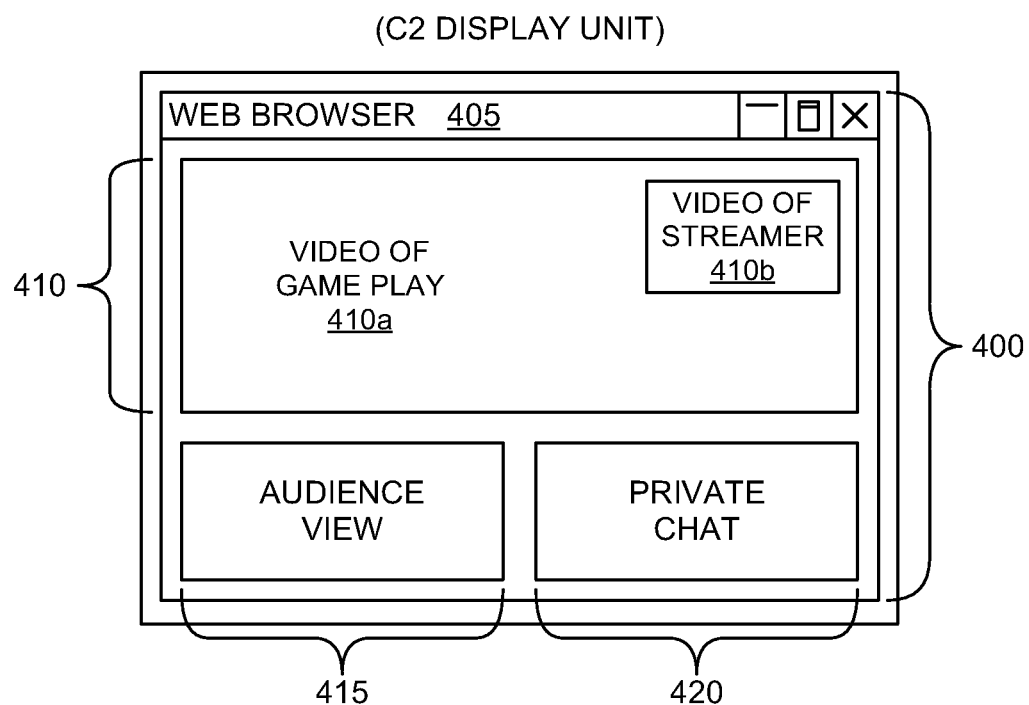
FIG. 4 illustrates an exemplary user interface on a streamer's computing device in accordance with some embodiments.

In some embodiments, as illustrated in FIG. 4, an exemplary user interface 400 rendered in the web browser 405 includes at least two sections: a first section 410 shows a video 410a of the game play and a video 410b of the streamer, and a second section 415 shows an audience associated with the streamer's feed. The audience includes at least a portion of all viewers who are currently watching the streamer's feed. In some embodiments, all viewers in the audience are friends with the viewer 115.

The second section 415 of the user interface 400 allows the viewer 115 to provide comments for the streamer 405 and other viewers in the audience to see, and to see comments from the other viewers in the audience. As soon as the viewer 115 enters a comment on C2, the comment 310 is displayed in real-time as an image (e.g., animated GIF) or as text on top of the game play 310 on C1, as well in real-time on other viewing devices used by the other viewers in the audience. In some embodiments, the viewer's comment appear in real-time in web browsers on the other viewing devices.

Briefly, in some embodiments, messages from the audience are filtered so that each user (e.g., either a viewer in the audience or the streamer) do not see all messages but only filtered and/or relevant messages based on one or more filters that are configured for that user. An exemplary filter is a Friends filter, which allows a user to see messages from those that the user is following. Other exemplary filters, such as a Location filter, a Content filter, a Top Fan filter, and an Upvoted filter, are contemplated. The Location filter allows a user to see messages from those viewers in the same or a selected geographical region. The Content filter allows a user to see messages that do not include content that the system or the user has determined as being inappropriate. The Top Fan filter allows a user to see messages from those who are "popular" in the audience such as those being followed by a predetermined number of viewers. The Upvoted filter allows a user to see a message that has been selected by sufficient viewers in the audience such that the message earns exposure to a greater number of users. Details of the real-time messaging are further discussed below.

In some embodiments, the user interface 400 includes a third section 420, which allows the viewer 115 to start/join at least one private chat, each with specific viewers from the audience that the viewer 115 wants to chat with. The second and third sections 415, 420 are simultaneously displayed in the user interface 400 such that the viewer 115 can engage in the private conversation while seeing a filtered view of what the audience is saying. In some embodiments, the streamer 105 can also participate in the private conversation.

In some embodiments, viewers are able to obtain virtual goods to enhance their experience on the social entertainment platform. For example, a viewer is able to purchase a "virtual microphone" to make one or two comments more prominent so that the comment(s) can be seen by the streamer and all viewers who are currently watching the streamer's game play. For another example, a viewer is able to sponsor (e.g., tip) or gift (e.g., flowers) a streamer.

As demonstrated herein, the social entertainment platform provides a people-centric approach for obtaining video streams and comments. Unlike traditional platforms that have a content-centric approach, a user can select which members to follow so that the user sees first and foremost comments from those in the audience the user wants to hear from.

Real-Time Video Broadcasting.

Referring back to FIG. 1, the streamer's computing device C1 includes a GPU (graphics processing unit), which is used by a game running on C1 to render a video on the display unit 130. The Caffeine client software, which is also running on C1, includes a variable whitelist of games that are permitted and/or compatible to be streamed while being played. Alternatively, a blacklist of games, rather than a whitelist of games, can be included in and used by the Caffeine client software. The blacklist is a list of games that is incompatible and/or not permitted to be streamed by Caffeine while played. In some embodiments, the Caffeine client software is periodically updated by Caffeine.

When the Caffeine client software recognizes that a compatible (e.g., "streamable") game is running, the Caffeine client software inserts a DLL (dynamic link library) into the game. The DLL changes the APIs (application program interfaces) that the game is using to send drawing commands to the GPU so that the Caffeine client software is able to access them. By accessing these drawing commands first, the Caffeine client software is able to capture the video, frame buffer by frame buffer. The Caffeine client software sends the captured video, along with the live camera feed, to the cloud infrastructure 110 for distribution to viewers 115. At substantially the same time, the Caffeine client software modifies the captured video by writing comments from the streamer's audience back to the frame buffers to the GPU for rendering on the display unit 130 for the streamer 105 to see. The Caffeine client software essentially makes available two versions of the captured video. One of the versions is the original, unaltered video, which is to be forwarded to the cloud infrastructure 110 for real-time video broadcasting to the streamer's audience. The other version is an altered video, which is the original video modified with audience comments, that is rendered to the streamer 105.

The Caffeine client software is built out of different components. In some embodiments, one of them is the WebRTC (Web Real-Time Communication) framework. Other components could be substituted. WebRTC is a set of communications protocols and application programming interfaces that enable real-time communication over peer-to-peer connections. The WebRTC framework in the Caffeine client software takes the raw frames and encodes them into a compressed video stream (e.g., VP8, H.264) so that it can be transmitted in real-time to the cloud infrastructure 110 for broadcasting.

The cloud infrastructure 110 includes a fan-out architecture of servers 120 arranged in a plurality of repeater levels (Level 1 to Level N), wherein each of the repeater levels has more servers than the previous repeater level in the fan-out architecture. In some embodiments, each server 120 in the cloud infrastructure 110 runs Janus, which an open source software, and also implements WebRTC protocols. Each server 120 takes incoming compressed video stream (including the captured game play and the camera feed) and repeats it to the next repeater level servers 120 that are coupled to it. For example, the compressed video stream from the C1 is received by the server $1S_1$ at the first repeater level, which forwards it to the servers in the second repeater level, namely $2S_1$, $2S_2$ and $2S_3$, and each of those servers forwards it on to those servers coupled to it, and so forth. This repetition has a multiplicative effect, allowing the compressed video stream to reach all requesting viewers 115 simultaneously and, thereby, allowing all participants to engage (e.g., seeing and replying to comments) with one another in substantially real-time.

Eventually, the compressed video stream reaches the viewer's computing device C2 from server $NS_X$. The web browser on C2 is configured to decode and render the compressed video stream received from one of the plurality of servers 120. The fan-out architecture of servers 120 prevents or, at least, limits time shifting of the distribution of the video stream such that everyone who is watching the game play is watching in sync. All requesting viewers 115 are seeing substantially the same content that the streamer 105 is seeing. In some embodiments, there is less than one second of delay between the actual game play and the webcam of the streamer 105 and what the viewers 115 are seeing, which is nearly real-time. In some embodiments, the delay is 190 milliseconds, which is substantially real-time. The substantially real-time aspect of the video broadcast enables instantaneous engagement between the streamer 105 and the viewers 115. For example, a viewer can be respond or react to what the streamer just said or to a move the streamer just made in the game play.

As discussed above, WebRTC is a collection of communications protocols and application programing interfaces that enable real-time communication over peer-to-peer connections. WebRTC's primary use case is video conferencing. However, the Caffeine client software and the cloud servers 120 utilize WebRTC to enable web broadcasting.

Real-Time Messaging.

The following discussion of the real-time messaging component is in the context of one broadcast message regarding a video stream. The real-time messaging component can be implemented on an application server and/or one of the previously discussed servers. It should be noted that all servers discussed herein are communicatively directly coupled or indirectly via network(s), and have access to necessary data stores.

FIG. 5A illustrates a block diagram of an exemplary real-time messaging component 500 in accordance with some embodiments. The real-time messaging component 500 includes a plurality of annotator elements 510 and a sieve element 505. The plurality of annotator elements 510 is configured in an arrangement with a first and a last of the plurality of annotator elements 510 both in direct communication with the sieve element 505. Each annotator element 510 includes logic to create a specific annotation regarding a message from a generating client device for each requesting client device. The sieve element 505 includes logic to recognize or determine when a requesting client device is open for communication and to inform the first annotator element in an arrangement of the plurality of annotator elements 510 of such so that the annotator elements 510 can make annotations for that requesting client device, and to make a final determination as to whether to pass a particular message from the last annotator element in the arrangement to that requesting client device based on all annotations made by all annotator elements in the arrangement. In some embodiments, the sieve element 505 does not make such determinations for a requesting client device until the number of messages has passed to or the rate of messages being passed to the requesting client device exceeds a predetermined threshold. Until the sieve element 505 starts making such determinations, the sieve element 505 simply forwards all messages pertaining to the video stream that the requesting client device is viewing, to the requesting client device.

Assume the predetermined threshold has been met for Client 1 and Client 1 has indicated that it is able to receive a message (e.g., comment), and Client 2 has output a message (e.g., comment) 520. Client 1 can either be a viewing device or a streaming device, while Client 2 is a viewing device. The message 520 output from Client 2 is received by a first annotator element 510. The sieve element 505, determining that Client 1 is open for communication, notifies the first annotator element 510 of such. Each annotator element 510, including the first annotator element, receives the message and other annotations, if any, generates its own annotations for the message, and passes the message and all annotations, including its own annotations, to other downstream element(s) 510 coupled with it. The message 520 and all of the annotations are eventually received by the sieve element 505, which makes a determination, based on all of the annotations generated by all of the annotator elements 510, as to whether to forward the message 520 to Client 1 or to drop the message 520. For example, when too many messages are generated for a particular stream, the sieve element 505 ensures that a user interact only with other users that the user should be interacting with and not necessarily with random person who commented on the particular stream. In other words, those messages forwarded to Client 1 from and by the sieve element 505 are typically more relevant to Client 1 than not.

FIG. 5A illustrates a Relationship Annotator (RA), a Graph Annotator (GA) and a Location Annotator (LA), and other annotator elements, all arranged serially for purposes of discussion. However, there can be any number of annotator elements (more or less than what is illustrated in FIG. 5A) and the annotator elements can be arranged in serial and/or in parallel arrangements. For instance, FIG. 5B illustrates an exemplary arrangement of annotator elements 510, wherein information is passed from one annotator element 510 to two annotator elements 510 for parallel processing, which in turn send the information to another annotator element 510 for further serial processing. Since the arrangement of the annotator elements 510 greatly affects the performance of the system, the arrangement can be reconfigured and refined. In addition, annotator elements 510 can be dynamically added to or removed from the real-time messaging component 500. Regardless of how the annotator elements 510 are arranged or the number of annotator elements 510 there are, the message 520 output from Client 2 is eventually received by the sieve element 505 via the annotator elements 510. The sieve element 505 determines whether to forward the message 520 to Client 1 or to drop the message 520.

Although it is shown in FIG. 5A that Client 2 generates a message, Client 1 can also generate messages. The sieve element 505 is configured to recognize or determine when a client device is open for communication, and to recognize or determine when to forward messages to the client device or when to drop messages. In some embodiments, the sieve element 505 is configured as a filter.

In some embodiments, the Relationship Annotator generates annotations describing the relationship between the message generator or poster (e.g., Client 2) and the potential viewer (e.g., Client 1), such as whether Client 1 is a follower of Client 2. In some embodiments, the Graph Annotator generates annotations describing the social distance between Client 1 and Client 2. The closer the clients are grouped implies Client 1 may be more interested than not in Client 2's comments. The proximity of the clients is dependent on the social distance between them, such as the number of friends they have in common. In some embodiments, the Location Annotator generates annotations describing the physical distance between Client 1's location and Client 2's location. As discussed above, other annotator elements 510 are contemplated and can be included as part of the real-time messaging component 500. In some embodiments, each of the annotator elements 510 corresponds with one of the filters described above.

Assume that the sieve element 50 determines to forward the message (e.g., comment) 520 to Client 1 in FIG. 5A. If Client 1 is a viewing device, then the incoming message is received by and displayed in a web browser on the viewing device. The web browser also has the ability to send messages (e.g., comments) input by the viewer. If Client 1 is the streaming device, then the incoming message is displayed as an image (e.g., animated GIF) or as text on top of the game being played on the streaming device. If the streamer would like to provide comments, the streamer simply speaks into the microphone.

Integrated User Interface.

Unlike traditional systems where two separate screens or two separate windows on one screen are used (one to create content, such as game play, and another to consume content from viewers, such as comments), a streamer on the social entertainment platform uses only one window (e.g., game window) on one screen to create and consume content. This allows the streamer to be able to quickly, seamlessly and conveniently interact with the streamer's viewers. Comments can be filtered such that the streamer only sees relevant comments displayed as overlays on top of the game play, as illustrated in FIG. 3. In some embodiments, only those comments from viewers the streamer is following and those comments that have been voted up would be displayed. The streamer do not need to look to a different window or to a different screen to view the displayed comments. The streamer simply looks in front, at the game play to view comments, which enhances the streamer's viewing experience. To respond to any of the displayed comments, the streamer simply speaks to be captured by the microphone.

Unlike traditional systems where content displayed for a viewer can be overwhelming, the viewer, upon log in, enters the viewer's own personalized lobby of feeds associated with the viewer's friends. These friends are members of the Caffeine service whom the viewer is following and/or who is following the viewer. The lobby of feeds includes streams that are currently live on Caffeine that the viewer's friends are either watching or broadcasting. The viewer can select a stream to watch with the viewer's friends. Upon a selection, the viewer can watch the streamer's live stream, enter comments, view comments entered by the viewer's friends who are also part of the audience watching the streamer's live stream, and privately chat with one or more of these friends who are in the audience, as illustrated in FIG. 4.

Social Entertainment Platform.

Figure 6:
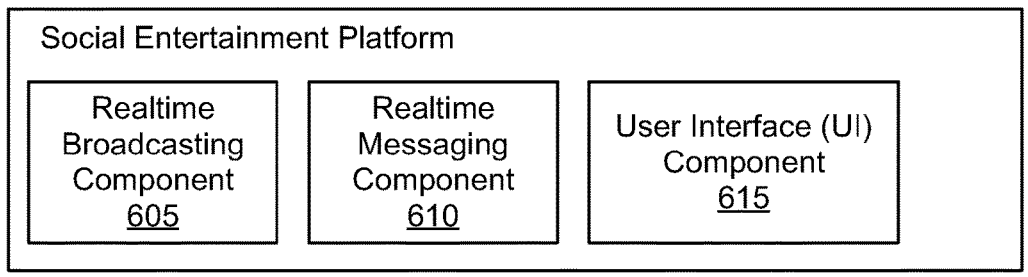
FIG. 6 illustrates a block diagram of an exemplary social entertainment platform in accordance with some embodiments.

FIG. 6 illustrates a block diagram of an exemplary social entertainment platform 600 in accordance with some embodiments. The social entertainment platform 600 includes a real-time broadcasting component 605, a real-time messaging component 610, and an integrated UI component 615. The real-time broadcasting component 605, as described elsewhere herein, enables all viewers of a stream to see the same thing that the streamer of the stream is seeing at substantially the same time (in real-time). In some embodiments, the delay between what the streamer is seeing and what the viewers are seeing is approximately 190 milliseconds, which is substantially real-time. The real-time broadcasting component 605 also enables all these viewers to view the stream in sync (e.g., no time shifting of the distribution of the video stream).

The real-time messaging component 610, as described elsewhere herein, enables filtering of messages such that each of the viewers and the streamer sees his/her own filtered view of the messages. The messages from the viewers are filtered separately for each of the viewers and the streamer. The filtered view allows each of the viewers and the streamer to interact only with certain viewers in the audience, such as those who are friends or those whose messages are voted up.

The UI component 615, as described elsewhere herein, enables filtered messages to be displayed as overlays in a game. The comments are displayed as animated images or as text and disappear after a predetermined amount of time to make room for new comments. The display of comments on top of the game allows the streamer to look at one screen on one display unit so that the streamer can quickly interact with the audience, thus bettering the viewing experience.

The UI component 615 also enables a viewer to watch alongside with the viewer's friends. The viewer's personalized lobby includes streams that are currently live on Caffeine that the viewer's friends are either watching or broadcasting. Upon selecting the streamer's feed, the corresponding video and audio of the game play and the corresponding video and audio of the streamer start streaming to the viewer's computing device. The viewer is able to see a filtered view of comments and is also able to chat with one or more friends, thus bettering the audience experience.

Figure 7:
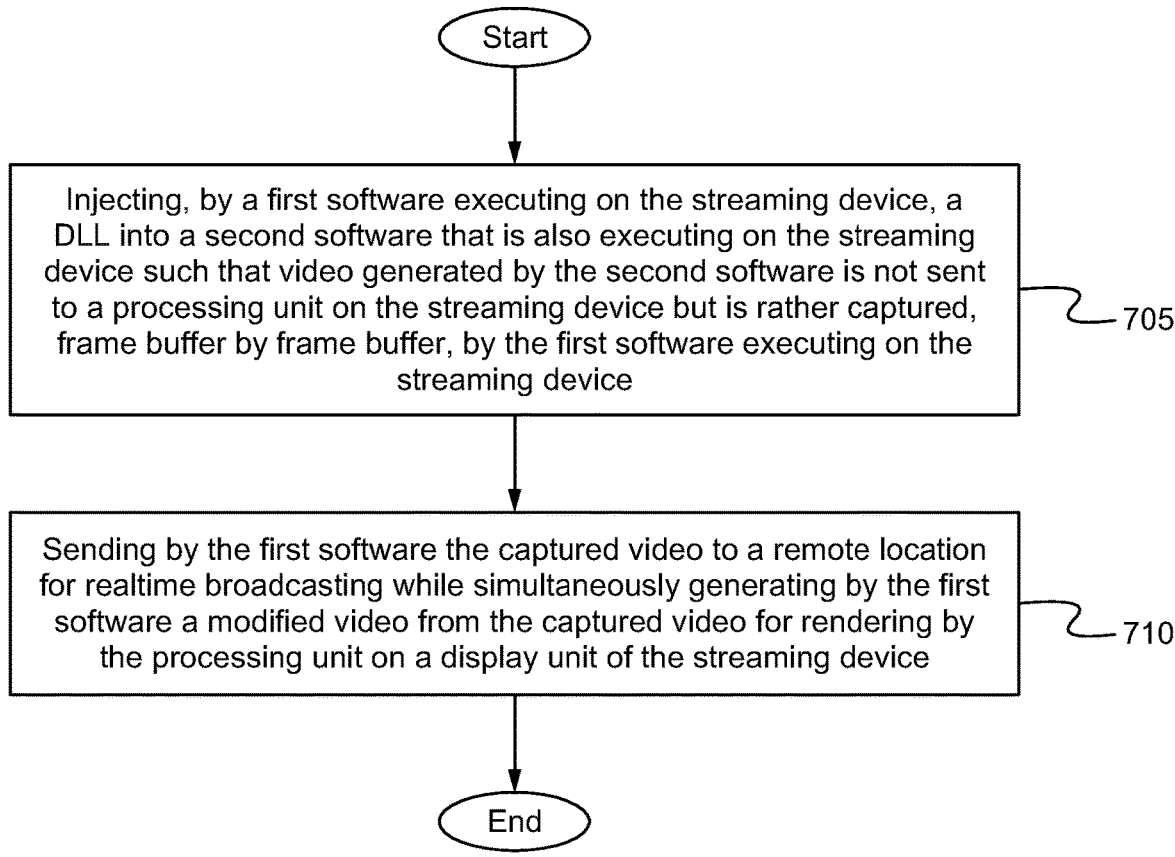
FIG. 7 illustrates an exemplary method of using the social entertainment platform for real-time distribution of content from a streaming device to a plurality viewing devices in accordance with some embodiments.

FIG. 7 illustrates an exemplary method 700 of using the social entertainment platform for real-time distribution of content from a streaming device to a plurality viewing devices in accordance with some embodiments. The method 700 begins a step 705. At the step 705, a first software, executing on the streaming device, injects a DLL into a second software that is also executing on the streaming device such that video generated by the second software is not sent to a processing unit on the streaming device but is rather captured, frame buffer by frame buffer, by the first software executing on the streaming device. The first software is the Caffeine client software. The second software can be a game that the first software has determined to be "streamable." As such, the first software is typically executed on the streaming device prior to the second software being executed on the streaming device.

At a step 710, the first software sends the captured video to a remote location for real-time broadcasting while simultaneously generating a modified video from the captured video for rendering by the processing unit on a display unit of the streaming device.

In some embodiments, after the video is captured, the first software encodes raw frames of the captured video into a compressed video stream to be transmitted in real-time by the first software to the remote location. In some embodiments, the compressed video stream also includes a live camera feed captured by the streaming device. The remote location includes a cloud infrastructure of a plurality of remote servers configured in a plurality of repeater levels such that the compressed video stream simultaneously reaches the plurality of viewing devices. In some embodiments, the compressed video stream is received simultaneously at each of the plurality of viewing devices. The compressed video stream is rendered by a web browser on each of the plurality of viewing devices, and a filtered view of comments is also displayed on each of the plurality of viewing devices.

In some embodiments, the first software generates the modified video by writing comments to the frame buffers such that the comments are displayed as overlays when the modified video is rendered on the streaming device. The comments are generated on web browsers of the plurality of viewing devices. The comments are filtered comments that are more relevant to a user associated with the streaming computing device than not.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A method of using social entertainment platform for realtime distribution of content from a streaming device to a plurality viewing devices, comprising:

injecting, by a first software executing on the streaming device, a DLL into a second software that is also executing on the streaming device such that video generated by the second software is not sent to a processing unit on the streaming device but is rather captured, frame buffer by frame buffer, by the first software executing on the streaming device;

sending by the first software the captured video to a remote location for realtime broadcasting while simultaneously generating by the first software a modified video from the captured video for rendering by the processing unit on a display unit of the streaming device, wherein the first software is executed on the streaming device prior to executing the second software on the streaming device;

after capturing, frame buffer by frame buffer, and before sending by the first software the captured video, encoding by the first software raw frames of the captured video into a compressed video stream to be transmitted in realtime by the first software to the remote location, wherein the remote location includes a cloud infrastructure of a plurality of remote servers configured in a plurality of repeater levels such that the captured video simultaneously reaches the plurality of viewing devices, wherein the compressed video stream also includes a live camera feed captured by the streaming device;

receiving the captured video simultaneously at each of the plurality of viewing devices;

rendering the captured video by a web browser on each of the plurality of viewing devices; and displaying a filtered view of comments on each of the plurality of viewing devices.

2. The method of claim 1, wherein generating by the first software a modified video includes writing comments to the frame buffers such that the comments are displayed as overlays when the modified video is rendered on the streaming device.

3. The method of claim 2, wherein the comments are generated on web browsers of the plurality of viewing devices.

4. The method of claim 3, wherein the comments are filtered comments that are more relevant to a user associated with the streaming computing device than not.

5. A system for realtime distribution of content from a streaming device to a plurality viewing devices, comprising:

a streaming device redirecting video generated on the streaming device to be captured rather than to be rendered, transmitting therefrom an original version of the captured video while simultaneously generating a modified version of the captured video to be rendered;

a cloud infrastructure including a fan out architecture of remote servers arranged in a plurality of repeater levels, wherein each of the remote servers receives and forwards a compressed video stream;

a plurality of viewing devices simultaneously receiving the compressed video stream from the cloud infrastructure, wherein each of the viewing devices decodes and renders the video stream in a web browser, wherein the streaming device captures a live camera feed and transmits the live camera feed along with the original version as the compressed video stream, wherein the streaming device and the remote servers each implements WebRTC protocols to enable web broadcasting of the compressed video stream, wherein the plurality of viewing devices generates a plurality of comments from the web browsers, wherein the plurality of comments are filtered for each viewer associated with one of the viewing devices and for a streamer associated with the streaming device, wherein the modified version of the captured video is the original version of the captured video modified with filtered comments for the streamer, wherein a filtered view of comments for each viewer is also displayed in the web browser on a respective viewing device; and a realtime messaging component comprising a plurality of annotator elements and a sieve element, wherein the plurality of annotator elements is configured in an arrangement with a first and a last of the plurality of annotator elements both in direct communication with the sieve element.

6. The system of claim 5, wherein each of the annotator elements includes logic to create a specific annotation regarding a comment for each requesting device, and wherein the sieve elements includes logic to make a determination as to whether to pass the message to each requesting device based on the annotations from the plurality of annotator elements.

* * * * *